No. 821,040. PATENTED MAY 22, 1906.
S. A. JONES.
MINNOW PAIL.
APPLICATION FILED DEC. 20, 1905.

2 SHEETS—SHEET 1.

WITNESSES:
James P. Duhamel
Frank Shaughnessy

INVENTOR
Samuel A. Jones
BY
James Hamilton
ATTORNEY

No. 821,040. PATENTED MAY 22, 1906.
S. A. JONES.
MINNOW PAIL.
APPLICATION FILED DEC. 20, 1905.

2 SHEETS—SHEET 2.

WITNESSES:
James F. Duhamel
Frank Shaughnessy

INVENTOR
Samuel A. Jones
BY
James Hamilton
ATTORNEY

UNITED STATES PATENT OFFICE.

SAMUEL A. JONES, OF DESHLER, OHIO.

MINNOW-PAIL.

No. 821,040.  Specification of Letters Patent.  Patented May 22, 1906.

Application filed December 20, 1905. Serial No. 292,556.

*To all whom it may concern:*

Be it known that I, SAMUEL A. JONES, a citizen of the United States, residing in Deshler, in the county of Henry and State of Ohio, have invented certain new and useful Improvements in Minnow-Pails, of which the following is a specification, reference being had to the accompanying drawings, forming a part thereof.

My invention relates to pails for the preservation in a live condition of bait, such as minnows; and the object of my invention is to provide a pail of the class described which will be simple in construction, cheap in manufacture, and efficient in operation.

One feature of my invention consists in the provision of the inset or cage member of the device with a chamber in its top, which acts both as a float and as an air-reservoir.

Another feature of my invention resides in the novel means provided for the gradual feeding of air from the air-reservoir to the water.

Figure 1:
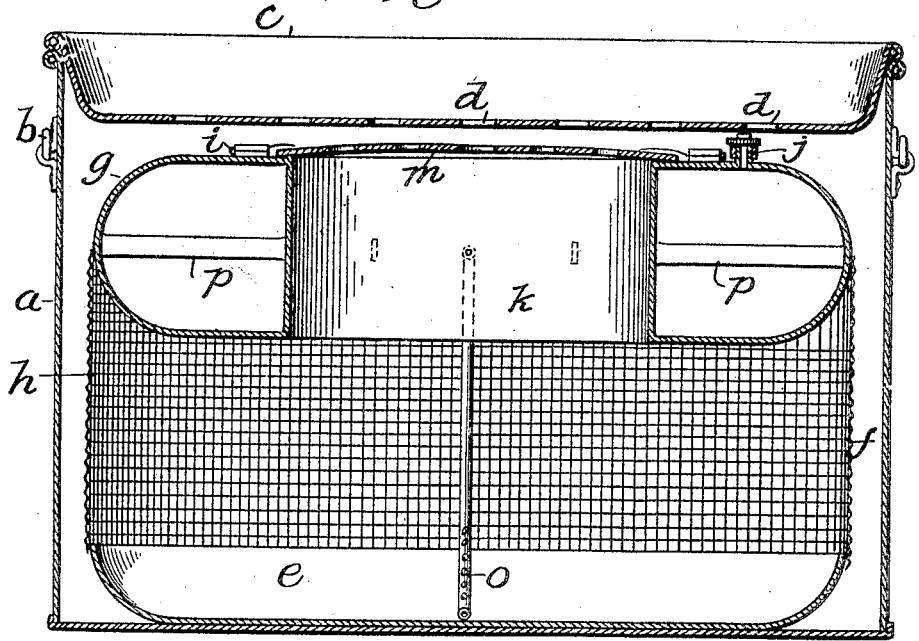
Figure 2:
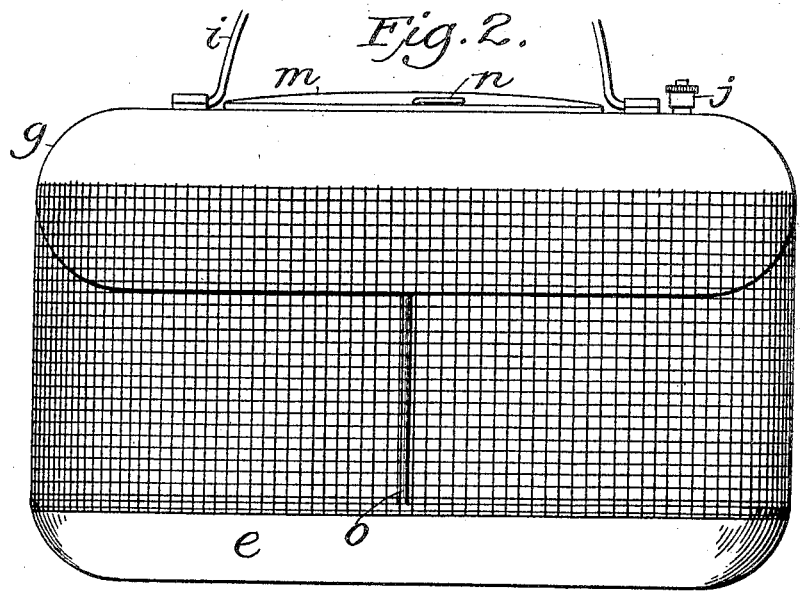
Figure 3:
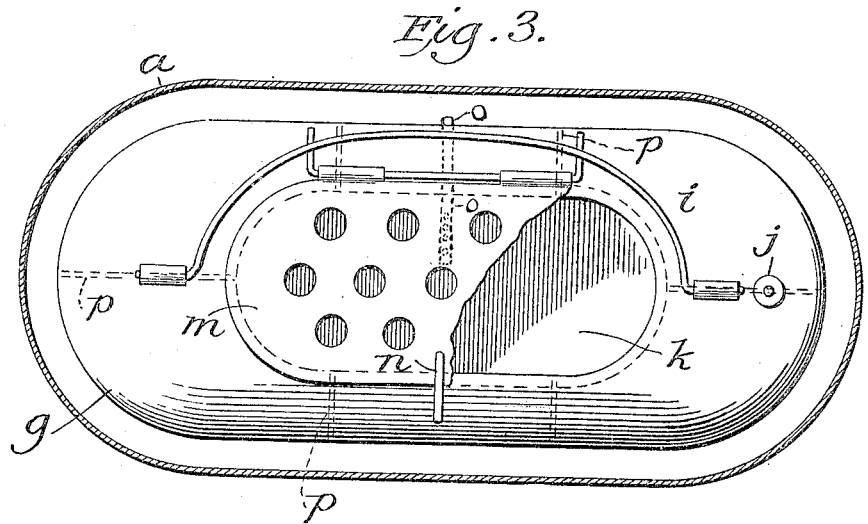

In the drawings, illustrating the principle of my invention and the best mode now known to me of applying that principle, Figure 1 is a central longitudinal sectional view through the bucket and inset contained therein. Fig. 2 is an elevation of the inset or cage member; and Fig. 3 is a top plan view of the inset, the bucket being shown in sectional view.

The water receptacle or bucket $a$ is provided with the usual bail $b$, by which it may be carried, and with a lid or cover $c$, formed with holes $d$. The lid $c$ is dished as well as formed with holes $d$, the dished shape adapting the lid to serve as a reservoir of ice and the holes $d$ permitting the circulation of cooled air within the bucket and the draining of the water from the melted ice. The inset $f$ is provided at its top with an annular air-reservoir $g$, which serves also as a float when the inset is immersed in water and which is connected to the bottom $e$ by means of the wirework $h$. The air-reservoir $g$ is provided with a bail $i$, by which it may be withdrawn from the bucket $a$, with a valve $j$ for the attachment of an air-pump by which the reservoir may be filled with compressed air, and with a central opening $k$, through which access may be obtained to the interior of the cage. This opening $k$ is covered with a hinged lid $m$, provided with a catch $n$ and formed with apertures permitting the circulation of air.

Leading from the air-reservoir $g$ at the back of the cage to near the middle of the bottom $e$ is a hollow wire $o$, formed with a hair-like passage and with perforations for the escape of air from the reservoir into the cage to supply the minnows with air. The small size of the air-passage in the wire $o$ serves to control the feeding of the air to the water and makes it very gradual. The air-reservoir $g$ is provided with suitable stays $p$ to strengthen it to receive and withstand the air-pressure.

I am aware that an imperforate chamber has heretofore been mounted in the top of a cage for live bait to serve as a float therefor; but, so far as known to me, I am the first to provide such cage with a combined air-reservoir and float.

So far as known to me in all structures of this class heretofore made the air-reservoir has been formed as a part of the outer bucket or water-receptacle, while in my device it is mounted in the cage and serves the double function of a reservoir for air and a float.

What I claim is—

1. In a structure of the class described, the combination with a cage of a combined air-chamber and float mounted in the top thereof and provided with apertures for the admission and escape of air.

2. In a structure of the class described, the combination with a cage of an air-reservoir mounted in the top thereof and formed with a central opening giving access to the interior of the cage; said air-reservoir being provided with means for permitting the gradual escape of air therefrom.

3. In a structure of the class described, the combination of a device for holding live bait in water; and an air-reservoir provided with a tube the longitudinal passage through which is fine and hair-like, and compels the escape of air from the air-reservoir to the water therethrough to be gradual and slow.

4. In a structure of the class described, the combination of a cage having reticulated lateral walls; an air-chamber mounted therein; said air-chamber being provided with means for the attachment of an air-pump and with means for permitting the gradual escape of air.

SAMUEL A. JONES.

Witnesses:
 M. M. ROSS,
 J. B. GRIBBELL.